(12) United States Patent
Okada et al.

(10) Patent No.: US 7,939,748 B2
(45) Date of Patent: May 10, 2011

(54) PHOTOELECTRIC CONVERSION ELEMENT

(75) Inventors: Kenichi Okada, Kohtoh-ku (JP);
Takayuki Kitamura, Kohtoh-ku (JP);
Hiroshi Matsui, Kohtoh-ku (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/480,378

(22) Filed: Jun. 8, 2009

(65) Prior Publication Data

US 2009/0235982 A1  Sep. 24, 2009

Related U.S. Application Data

(63) Continuation of application No. PCT/JP2007/073681, filed on Dec. 7, 2007.

(30) Foreign Application Priority Data

Dec. 11, 2006  (JP) .................................. 2006-333414
Dec. 11, 2006  (JP) .................................. 2006-333415

(51) Int. Cl.
*H01L 31/0224* (2006.01)
*H01L 31/0352* (2006.01)
*H01L 31/05* (2006.01)

(52) U.S. Cl. ........... 136/256; 136/252; 136/263; 438/99

(58) Field of Classification Search .......... 136/243–265; 438/57–98, 99
See application file for complete search history.

(56) References Cited

U.S. PATENT DOCUMENTS

| 6,538,194 B1 * | 3/2003 | Koyanagi et al. ............. 136/256 |
| 2003/0150485 A1 | 8/2003 | Koyanagi et al. |
| 2003/0201010 A1 | 10/2003 | Koyanagi et al. |
| 2005/0126629 A1 | 6/2005 | Okada et al. |
| 2009/0272431 A1 * | 11/2009 | Usui et al. ..................... 136/256 |

FOREIGN PATENT DOCUMENTS

| JP | 2000-77691 A | 3/2000 |
| JP | 2001-15182 A | 1/2001 |
| JP | 2001-43907 A | 2/2001 |
| JP | 2002-280085 A | 9/2002 |
| JP | 2005-44544 A | 2/2005 |

(Continued)

OTHER PUBLICATIONS

Brian O'Regan: "A low-cost, high-efficiency solar cell based on dye-sensitized colloidal TiO$_2$ films"Nature Oct. 24, 1991; vol. 353:pp. 737-739.

(Continued)

*Primary Examiner* — Basia Ridley
*Assistant Examiner* — Christina Chern
(74) *Attorney, Agent, or Firm* — Sughrue Mion, PLLC

(57) ABSTRACT

A photoelectric conversion element includes: a first electrode having a porous oxide semiconductor layer which supports a sensitizing dye on a surface thereof and functioning as a photo electrode; a second electrode disposed so as to oppose the first electrode; an electrolyte disposed in at least a part of a space between the first electrode and the second electrode; and a sump portion for the electrolyte disposed in at least a part of the space between the first electrode and the second electrode. According to the present invention, air bubbles can be exhausted effectively from power generating area, so that a photoelectric conversion element possessing an improved power generation property and a long-term durability can be provided.

3 Claims, 11 Drawing Sheets

FOREIGN PATENT DOCUMENTS

WO 2004/006381 A1 1/2004
WO WO 2006067969 A1 * 6/2006

OTHER PUBLICATIONS

M.Spath et al., "Reproducible Manufacturing of Dye-Sensitized Solar Cells on a Semi-automated Baseline"; Prog. Photovolt: Res. Appl. 2003; 11: p. 207-220.

R. Sastrawan et al., "A glass frit-sealed dye solar cell module with integrated series connections"; Solar Engergy Materials & Solar Cells, (2006) 90:11: 1680-1691.

* cited by examiner

PHOTOELECTRIC CONVERSION ELEMENT

TECHNICAL FIELD

The present invention relates to a dye-sensitized photoelectric conversion element, and more specifically to a photoelectric conversion element having an improved life duration such as a long-term durability and a high temperature durability.

Priority is claimed on Japanese Patent Applications No. 2006-333414, filed Dec. 11, 2006, and No. 2006-333415, filed Dec. 11, 2006, the contents of which are incorporated herein by reference.

BACKGROUND ART

With concerns over environmental issues, resources issues and the like, solar cells have received much attention as a clean energy source. Typical of the solar cells are those which use single crystal silicon, polycrystalline silicon, or amorphous silicon. However, since the conventional silicon solar cells require a decompression (or vacuum) process, the manufacturing cost thereof is high. In addition, for reasons such as the supply of the raw materials of the silicon solar cell being unstable, it is difficult to supply the solar cells at a low price. Thus, there are many problems to be solved to diffuse the solar cells widely.

Furthermore, compound solar cells, such as ones using the Cu—In—Se system (also called the CIS system) have been developed, and have superior features such as having an extremely high photoelectric conversion rate. However, problems such as cost and environmental load also prevent them from being diffused widely.

On the other hand, a dye-sensitized solar cell (referred to as "DSC" hereinafter) has been suggested by a Swiss research group led by Graetzel et al. or the like. Since DSC hardly requires the decompression (or vacuum) process in manufacturing, DSC has received attention as a photoelectric conversion element which can be manufactured with low cost and can obtain excellent photoelectric conversion efficiency (see Non-Patent Document 1).

Generally, a wet type solar cell including DSC has a structure in which an electrolyte is held between a transparent photo electrode letting light enter and a counter electrode composed of a conductive glass substrate.

FIG. 27 is a schematic sectional view illustrating a structure of a conventional wet type solar cell.

This DSC 200 generally includes a first base material 201 on one surface of which a porous semiconductor electrode 203 (also referred to as "dye-sensitized semiconductor electrode" hereinafter) on which a sensitizing dye is supported is formed, a conductive second base material 204 on which a catalyst layer 205 is formed, and an electrolyte layer 206 which is made of gelled electrolyte or the like and is sealed into the space between the first base material 201 and the second base material 204.

As the first base material 201, for example, a plate material having light transparency may be used, and on the surface of the first base material 201 contacting the dye-sensitized semiconductor electrode 203, a transparent conductive film 202 is disposed in order to impart conductivity. The first base material 201, the transparent conductive layer 202, and the dye-sensitized semiconductor electrode 203 constitute a photo electrode (also referred to as "working electrode") 208.

On the other hand, since the second base material 204 exchanges electric charges with the electrolyte layer 206, the catalyst layer 205 made of carbon, platinum, and the like is disposed on the surface of the second base material 204 contacting the electrolyte layer 206. The second base material 204 and the catalyst layer 205 constitute a counter electrode 209.

The first base material 201 and the second base material 204 are disposed with a predetermined space in such a manner that the dye-sensitized semiconductor electrode 203 and the catalyst layer 205 oppose each other, and sealants 207 are provided at the periphery of the space between the two base materials. The two base materials 201 and 204 are bonded each other via the sealants 207 to assemble a cell, and an organic electrolyte solution containing redox couples such as iodine/iodide ion is filled between the two electrodes 208 and 209 via an electrolyte inlet 210, thereby forming the electrolyte layer 206 for charge transport.

On such DSC, a sealing operation is carried out before use in order to prevent leakage and volatilization of the electrolyte.

The sealing technologies of the DSC may be roughly classified into the following two groups.

One is a method using resin for the sealing material, in which sealants made of thermoplastic resin are disposed in the periphery of the space between the photo electrode and the counter electrode, the two electrodes are bonded via the sealants by curing the sealants, and an electrolyte is injected thereinto (see Non-Patent Document 2 and Non-Patent Document 4, for example).

Another is a method using glass for the sealing material, in which sealants made of glass with a low melting point are disposed in the periphery of the space between the photo electrode and the counter electrode, the two electrodes are bonded via the sealants by heat-melting the sealants, and then an electrolyte is injected thereinto (see Non-Patent Document 3 and Non-Patent Document 4, for example).

With such sealing technologies, when the sealing material is resin, there are merits in work operations such that the process becomes simple since the sealing material can be sealed at ordinary temperature or a temperature below 140° C., which is the decomposition temperature of a dye. In particular production speed becomes high when hot-melt resin or UV-curable resin is used. However, there is a demerit of inferior durability. On the other hand, when the sealing material is glass, there are demerits in work operations such that the process speed is slower than the case of resin since a temperature above 450° C. is required for glass melting, and that the yield rate is inferior since pinholes and cracks are easily made. However, there is a merit of superior durability.

When DSC is used under a high temperature for a long period of time, air bubbles tend to be generated due to leakage and volatilization of the electrolyte, or due to the change of pressure within the cell. These air bubbles tend to be generated not only in the vicinity of the sealants in the cell but everywhere. At the part where the air bubbles are generated, charge transfer is not carried out properly so that the power generation property deteriorates. Furthermore, this part will also cause cell failure since decomposition of sensitizing dye or the like occurs.

Accordingly, a method to execute the sealing operation with resin has been proposed as one method to solve the above-described problems and to improve the durability (see Patent Document 1). Generally, resin has high gas permeability, so that the electrolyte is gradually leaked through inside the resin or the surface thereof. According to this proposal, an electrolyte storage portion is disposed at the upper part of the outside of the DSC for replenishing the electrolyte. Accordingly, since a solar cell is used by refilling the electrolyte from the electrolyte storage portion according to the quantity of the electrolyte that leaked out, a solar cell having an extended life-time thereof can be proposed.

However, in such a structure in which the electrolyte storage portion is disposed outside the DSC as the method described in Patent Document 1, the DSC will be large and bulky so that extra space is needed when the DSC is installed to be used, that is, it can not be easily handled. Moreover, since the method is to supply electrolyte from the electrolyte storage portion disposed in the upper part of the DSC by using gravity, the setting direction of the DSC was limited concerning a placement position of the electrolyte storage portion, and it was extremely difficult to effectively exhaust small-sized air bubbles generated around a central region of a cell.

[Patent Document 1] Japanese Unexamined Patent Application, First Publication No. 2002-280085

[Non-Patent Document 1] O'Regan B, Gratzel M., "A low cost, high-efficiency solar cell based on dye-sensitized colloidal TiO2 films", Nature 1991; 353: 737-739

[Non-Patent Document 2] M Spaeth re al., Prog. Photovolt: Res. Appl. 2003; 11: 207-220

[Non-Patent Document 3] R. Sastrawan re al., Sol. Ener. Mat. Sol. Cells 2006; 90: 11: 1680,

[Non-Patent Document 4] Patent Office: Collection of Standard Technologies, dye-sensitized solar cell, <http://www.jpo.go.jp/shiryou/s_sonota/hyoujun_gijyutsu/solar_cell/01_mokuji.htm>, Chapters 6-B-6-C

DISCLOSURE OF THE INVENTION

Problems to be Solved by the Invention

The present invention was devised in view of the above circumstances, and has as an object the provision of a photoelectric conversion element which is free from being bulky without an external electrolyte storage portion and is space-saving at the time of installation of DSC, and which has a structure that can remove air bubbles effectively from a power generating area regardless of the setting direction of the DSC, thereby having both a superior power generation property and a long-term durability.

Means for Solving the Problems

A photoelectric conversion element according to the present invention includes: a first electrode having a porous oxide semiconductor layer which supports a sensitizing dye on a surface thereof and functioning as a photo electrode; a second electrode disposed so as to oppose the first electrode; an electrolyte disposed in at least a part of a space between the first electrode and the second electrode; and a sump portion for the electrolyte disposed in at least a part of the space between the first electrode and the second electrode.

In the photoelectric conversion element according to the present invention, it is preferable that the sump portion be composed of a recessed portion formed in a predetermined position of a conductive porous portion of the second electrode.

In the photoelectric conversion element according to the present invention, it is preferable to have a layer of a capillary structure on at least a part of the porous oxide semiconductor layer of the first electrode.

In the photoelectric conversion element according to the present invention, it is preferable that the stump portion be a void space former between mesh conductive layers of the second electrode.

In the photoelectric conversion element according to the present invention, it is preferable that at least a part of the mesh conductive layer be of a capillary structure.

In the photoelectric conversion element according to the present invention, it is preferable that the sump portion be composed of a recessed portion formed in the second electrode.

In the photoelectric conversion element according to the present invention, it is preferable that the first electrode have a collector wiring made of a conductive material and that the sump portion be provided around the collector wiring.

In the photoelectric conversion element according to the present invention, it is preferable that the second electrode have a conductive base material and that the sump portion be a recessed portion provided on the base material of the second electrode.

In the photoelectric conversion element according to the present invention, it is preferable that the recessed portions be provided in continuous arrangement along the collector wiring.

In the photoelectric conversion element according to the present invention, it is preferable that an inclined portion be provided on the second electrode in a manner such that the clearance between the first electrode and the second electrode is wider in periphery of the sump portion than the other parts.

In the photoelectric conversion element according to the present invention, it is preferable that a capillary structure be provided at least on the collector wiring.

Advantageous Effects of the Invention

The photoelectric conversion element according to the present invention has a structure in which a sump portion for an electrolyte is provided in at least a part of the space between a first electrode and a second electrode. That is, the sump portion for replenishing the electrolyte exists within the DSC, and when an air bubble is entrapped or generated at a power generating area, the air bubble is effectively induced to be exhausted from the power generating area to the sump portion by using surface tension of the air bubble whose driving force is stronger than that of buoyancy of the air bubble, so that the electrolyte within the sump portion can be supplied to the power generating area.

Accordingly, a wet type solar cell which is space-saving at the time of installation of the DSC which is free from being bulky without an external electrolyte storage portion, and which has a structure that can remove air bubbles effectively from power generating area can be obtained. Therefore, the present invention proposes a wet type solar cell having both a superior power generation property and a long-term durability.

DESCRIPTION OF THE REFERENCE SYMBOLS 1, 41, 61, 101 PHOTOELECTRIC CONVERSION ELEMENT
10, 107 FIRST ELECTRODE (WORKING ELECTRODE, PHOTO ELECTRODE)
11, 102 FIRST BASE MATERIAL
12, 103 TRANSPARENT CONDUCTIVE FILM
13, 104 POROUS OXIDE SEMICONDUCTOR LAYER
13A FIRST POROUS OXIDE SEMICONDUCTOR LAYER
13B SECOND POROUS OXIDE SEMICONDUCTOR LAYER
14 SENSITIZING DYE
20, 50, 70, 110 SECOND ELECTRODE (COUNTER ELECTRODE)
21, 51, 71, 108 SECOND BASE MATERIAL
22 CONDUCTIVE FILM (METAL MEMBRANE)
23, 53, 73, 112 SUMP PORTION
24 CONDUCTIVE POROUS PORTION
24a CONDUCTIVE POROUS PASTE
25, 114 CAPILLARY STRUCTURAL PORTION
26, 56, 76 ELECTROLYTE INJECTION HOLE
27 SUMP PORTION FORMING RESIN
28 SUMP PORTION FORMING RECESSED PORTION
30, 111 ELECTROLYTE
52 MESH CONDUCTOR
72 CATALYST LAYER OF COUNTER ELECTRODE
77 SUMP PORTION FORMING RECESSED PORTION
105 COLLECTOR WIRING
106 PROTECTIVE LAYER
109 CATALYST FILM
113 RECESSED PORTION
115 GROOVE
116 INCLINED PORTION

BEST MODE FOR CARRYING OUT THE INVENTION

While preferred embodiments of the photoelectric conversion element of the present invention will be described with reference to the accompanying drawings, the present invention is not limited thereto and those having a structure which satisfies the above-described operation and effect are within the scope of the present invention as well.

In the accompanying drawings, the reduction scale is not always drawn accurately in order to describe the present invention in an easy to understand manner.

Figure 1:
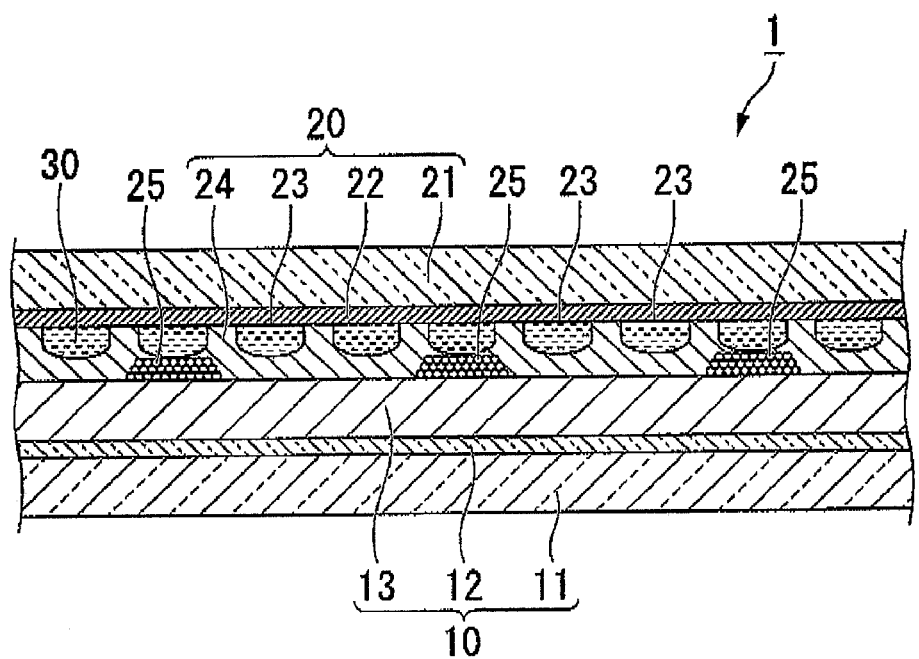
FIG. 1 is a sectional view illustrating an example (a first structure) of a wet type solar cell according to the present invention.

First of all, as an example of a structure is shown in FIG. 1, a photoelectric conversion element (or a wet type solar cell) according to the present invention basically includes a first electrode 10 having a porous oxide semiconductor layer (also referred to as "oxide electrode") 13 which supports a sensitizing dye on a surface of it, and functioning as a photo electrode (also referred to as "working electrode"), a second electrode 20 disposed so as to oppose the first electrode 10, and an electrolyte 30 disposed at least in a part of a space between the two electrodes. Further, the photoelectric conversion element 1 is structured with a sump portion 23 for the electrolyte 30 which is disposed at least in a part of the space between the first electrode 10 and the second electrode 20 so as to be provided inside the element. This basic structure also applies in examples of structures shown in FIGS. 13 and 17.

The first electrode includes, for example, a first base material, a transparent conductive film disposed on top of the first base material, and a porous oxide semiconductor layer disposed on top of the transparent conductive film. The first electrode obtains conductivity by forming a transparent conductive film (or layer) composed of a conductive material on the surface of the first base material composed of an optically transparent material, and through the transparent conductive film, the porous oxide semiconductor layer is formed.

The first base material, which is a part of the first electrode, functions as an electrode forming a cell accommodating the electrolyte as well as a cover body composing a housing.

For the first base material composing the first electrode, it is preferable to use a material having an optical characteristic to transmit the sunlight. Although a glass plate is generally used as the first base material, the material is not limited thereto in particular. Besides the glass plate, for example, plastics such as a polyethylene terephthalate (PET), a polyethylene naphthalate (PEN), and a polycarbonate (PC), and polished plates of ceramics such as a titanium oxide and an alumina can be used.

Also, an electrically conductive heat-resisting glass which is resistant against high temperature around 500° C. is preferably used as the first base material in the case in which titanium dioxide ($TiO_2$) is baked as a porous semiconductor for supporting a dye on the substrate on which a conductive film is formed.

On the surface of the first base material, a transparent conductive film which is also optically transparent and electric conductive is formed. As the transparent film possessing conductivity (referred to as "transparent conductive film"), an Indium-Tin-Oxide (ITO) film which is a membrane formed by adding a few % tin to indium oxide, Fluorine-doped-Tin-Oxide (FTO) film which is a membrane formed by adding a few % fluorine to tin oxide are listed as examples. Such a transparent conductive film is formed in a thickness of about 50 to 2000 nm, for example, to be used.

In the above-mentioned ITO film, the quadrivalence tin ($Sn^{4+}$) which is substituted for trivalence indium ($In^{3+}$) generates a carrier-electron, so that the ITO film possesses a characteristic of high electric conductivity. Moreover, the ITO film does not absorb most of the visible light since the energy gap thereof corresponds to the ultraviolet region. Therefore, the ITO film also possesses an ability to transmit most of the visible light spectrum composing the sunlight.

The transparent conductive film is formed by a vacuum film-forming method which utilizes reduced pressure air, such as known methods represented by a sputtering method, deposition method and the like. From among these methods, by selecting a suitable method according to the materials forming a transparent conductive film, a film possessing an excellent transparency and a high conductivity can be obtained.

On the transparent conductive film, a porous oxide semiconductor layer is provided. The porous oxide semiconductor layer is formed in a manner in which a dye is supported on a surface of a porous semiconductor. Materials and forming methods for the porous oxide semiconductor layer are not limited in particular, and materials and forming methods of any kind which are used to form a porous semiconductor for solar cells can be used. For such a semiconductor, $TiO_2$, $SnO_2$, $WO_3$, $ZnO$, $Nb_2O_5$, $In_2O_3$, $ZrO_2$, $Y_2O_3$, and $Al_2O_3$, for example, may be used.

While electrophoretic deposition of particles, a method in which paste is applied and then sintered, and the like may be illustrated as a method of forming the porous film, the method is not limited thereto. A sensitizing dye is adsorbed on the particle surface of the porous oxide semiconductor layer 13.

In the photoelectric conversion element, in order to improve conversion efficiency, dyes with a wide absorption wavelength range are used to absorb light in the visible region with a wavelength range of 400 nm to 900 nm, which forms a longer wavelength region than the ultraviolet region, as much as light in the ultraviolet region or more.

For such sensitizing dyes, a ruthenium complex having a bipyridine structure, terpyridine structure or the like in the ligand, metal complex such as porphyrin and phthalocyanine, and organic dye such as eosin, rhodamine, merocyanine may be suitably used. Among these, one with excitation behavior suitable for the purpose and the semiconductor to be used may be selected appropriately.

The above-described sensitizing dye is adsorbed and supported on top of the surface of the particle semiconductor of the porous oxide semiconductor layer.

On the other hand, the second electrode may include, for example, a second base material and a conductive porous portion formed thereon, a second base material and a mesh conductor, a second base material having holes or slots formed on the whole surface thereof and a catalyst layer of the counter electrode provided on the surface thereof, or the like.

The sump portion is roughly classified into four groups, that is, a first structure in which the sump portions are composed respectively of a recessed portion formed in predetermined positions of a conductive porous portion of the second electrode; a second structure in which the sump portions are composed respectively a space provided between mesh conductive layers of the second electrode; a third structure in which the sump portions are composed respectively of a recessed portion formed in the second electrode; and a fourth structure in which the sump portions are composed respectively of a recessed portion provided on the second base material of the second electrode and are disposed around a collector wiring of the first electrode.

Between the first electrode and the second electrode, the electrolyte is injected. As the materials composing the electrolyte, for example, liquid electrolyte formed by dissolving electrolyte components such as iodine/iodide ion and tertiary-butyl pyridine in an organic solvent such as ethylene carbonate and methoxyacetonitrile may be used.

The photoelectric conversion element constructed as described above has a sump portion provided between the first electrode and the second electrode, so that the element has a structure such that the sump portion exists within the DSC.

Therefore, the DSC is free from being bulky without an external electrolyte storage portion thereby making it easier to be handled and achieving space-saving at the time of installation of the DSC. Moreover, by using surface tension which is hardly affected by the setting direction of the cell as a driving force, air bubbles entrapped in the space between the first electrode and the second electrode can be effectively exhausted from the power generating area, Accordingly, a photoelectric conversion element possessing both a superior generation property and a long-term durability can be obtained.

First Embodiment

An example of the photoelectric conversion element of the present invention will be described in accordance with FIGS. 1 through 12.

FIG. 1 is a sectional view illustrating an example (a first structure) of a photoelectric conversion element according to the present invention.

As shown in FIG. 1, the photoelectric conversion element 1 according to the present embodiment includes a first electrode 10 having a porous oxide semiconductor layer 13 which supports a sensitizing dye on a surface of it, and functioning as a photo electrode, a second electrode 20 disposed so as to oppose the first electrode 10, and an electrolyte 30 disposed at least in a part of a space between the two electrodes. Further, the photoelectric conversion element 1 is structured with sump portions 23 which are composed respectively of a recessed portion and are provided in predetermined positions of a conductive porous portion 24.

The first electrode 10 is prepared by forming an FTO conductive film as a transparent conductive film 12 on the surface of a glass plate as a first base material 11, and via the transparent conductive film 12, the porous oxide semiconductor layer 13 is further provided. The porous oxide semiconductor layer 13 is formed in a manner in which a dye is supported on a surface of a porous semiconductor.

On the other hand, the second electrode 20 includes, for example, a dense second base material 21 and the conductive porous portion 24 formed thereon.

Since the second base material 21 composing the second electrode 20 does not necessarily possess optical transparency, a metal plate may be utilized, or the same materials as those used for the first base material 11 may be used. While a glass plate is generally used as the second base material 21, a plastic film sheet such as a polyethylene terephtalate (PET), a polyethylene naphthalate (PEN), and a polycarbonate (PC), or a polished plate of ceramics such as a titanium oxide and an alumina can be used besides the glass plate. A conductive film 22 is formed on the second base material 21.

The conductive film 22 is an electrode generating an electromotive force between the first electrode 10 and itself, and a metal membrane formed on one surface of the second base material 21 in order to impart conductivity to the second base material 21 may be used as the conductive film 22.

In regard to the forming methods of the conductive film 22, while the deposition method or the sputtering method may be used preferably, methods are not limited in particular as long as the resulting conductive film 22 functions as an electrode.

The conductive porous portion 24 has a structure in which a catalyst of the counter electrode is formed at least in the vicinity of the surface of the porous portion. The catalyst of the counter electrode is designed so as to be connected to the outside via a conductive path. Further, since it is necessary for the electrolyte 30 to move from the first electrode (titanium oxide electrode) 10 side to the porous portion side via the catalyst layer of the counter electrode, the catalyst layer of the counter electrode is formed so as not to be dense.

The conductive porous portion 24 is designed so as to contain void spaces corresponding to at least 5 volume % of the amount of electrolyte injected to the entire cell. If the electrolyte leaks out in large quantities, the electrolyte composition is largely modified due to the volatility difference among compositions, and the property deteriorates compared with the original even if the electrolyte is re-injected. Thus, about 20 volume % of the amount of electrolyte is enough for the void spaces at the maximum.

The size of porous holes generated on the surface (the surface on the first electrode side) of the conductive porous portion 24 may be less than a diameter of 1000 μm in order to secure the distance from the catalyst layer of the counter electrode to the first electrode 10. Also, the surface roughness of the conductive porous portion 24 in the power generating area may be less than 500 μm in order to secure the distance from the catalyst layer of the counter electrode to the first electrode 10.

Moreover, the size of porous holes generated on the surface (the surface on the first electrode side) of the conductive porous portion 24 may be larger than a smaller one of a diameter of 50 μm and the mean distance between the first electrode 10 and the second electrode 20. If the size is not larger, air bubbles are difficult to penetrate.

In order to induce the air bubbles effectively, it is preferable to make the porosity (or pore size) inside the second electrode 20 larger than that in the vicinity of the surface of the conductive porous portion 24. The inside of the second electrode 20 should not necessarily be porous and may be a simple cavity, instead.

When the size of porous holes in the vicinity of the surface of the conductive porous portion 24 exceeds a diameter of 50 μm, for the transfer of the electrolyte 30, it is preferable to form a structure in which capillary structural portions 25 are provided in the surface of the conductive porous portion 24 by a method that does not inhibit the movement of air bubbles, and the capillary structural portion 25 is provided at least on a part of the porous oxide semiconductor layer 13 of the first electrode 10.

It is necessary for the capillary structural portion 25 to be in contact with the first electrode 10. As the capillary structural portion 25, a bundle of extra fine wires, a mesh, or a porous formed by resin or glass on which hydrophilic treatment was applied, an oxide compound of ceramic or the like, metal with high chemical resistance such as titanium and niobium may be suggested. The electrolyte 30 can be supported by providing this capillary structural portion 25.

A recessed portion which composes the sump portion 23 is formed in the conductive porous portion 24.

The electrolyte 30 is injected to the space between the first electrode 10 and the second electrode 20. As the materials composing the electrolyte 30, for example, liquid electrolyte formed by dissolving electrolyte components such as iodine/iodide ion and tertiary-butyl pyridine in an organic solvent such as ethylene carbonate and methoxyacetonitrile may be used. The electrolyte 30 is also provided inside the conductive porous portion 24, the porous oxide semiconductor layer 13, and the capillary structural portion 25.

The photoelectric conversion element 1 constructed as described above has a structure in which the sump portions 23 composed respectively of a recessed portion are provided at least on a part of the conductive porous portion 24 of the second electrode 20.

Accordingly, the photoelectric conversion element 1 is free from being bulky and becomes easier to be handled, so that space-saving at the time of installation of the DSC can be achieved. Moreover, by using surface tension which is hardly affected by the setting direction of the cell as a driving force, air bubbles entrapped in the space between the first electrode 10 and the second electrode 20 can be effectively exhausted from the power generating area. The air bubbles are led into the recessed portions, so that the air bubbles generated in the power generating area can be easily removed. Accordingly, it is possible to form a photoelectric conversion element possessing both a superior power generation property and a long-term durability.

Next, an example of manufacturing methods of the photoelectric conversion element (the first structure) 1 according to the present invention will be described.

FIGS. 2 to 5 show steps in the sequence for manufacturing the first electrode 10 functioning as a photo electrode in the photoelectric conversion element of the present embodiment, and FIGS. 6 to 11 show steps in the sequence for manufacturing the second electrode 20 functioning as the counter electrode in the photoelectric conversion element of the present embodiment. FIG. 12 is a schematic sectional view showing a step for manufacturing the photoelectric conversion element 1 of the present invention by laminating the first electrode 10 and the second electrode 20 and then by jointing them.

First, the manufacturing method of the first electrode 10 will be described.

Figure 2:
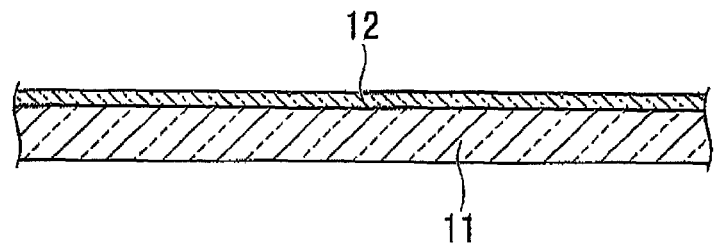
FIG. 2 is a sectional view showing a first step for manufacturing a first electrode (or a working electrode) composing the wet type solar cell shown in FIG. 1.

As shown in FIG. 2, the first base material 11 is prepared, and the transparent conductive film 12 is provided on one surface of the first base material 11.

As the first base material 11, while normally used glass plates may be quite all right to be used, plastics which can obtain an economical and lightweight module may be used instead.

As the forming method of the transparent conductive film 12, known methods may be suitably used according to the materials of the transparent conductive film 12. For example, a membrane of an oxide semiconductor such as Fluorine-doped-Tin-Oxide (FTO) may be formed by a sputtering method, CVD method (chemical vapor deposition method), SPD method (spray pyrolysis deposition method), deposition method, and the like. If the membrane is too thick, optical transparency deteriorates, while if the membrane is too thin, the conductivity deteriorates. Therefore, taking both the optical transparency and the conductivity into account, the membrane is formed with a thickness of about 0.1 μm to 1 μm.

Subsequently, after a resist is formed on the formed membrane by a screen printing method or the like, then the resist is etched to form the transparent conductive film 12 with a predetermined pattern on the surface of the first base material 11. The substrate material for the photo electrode is thus constructed.

Figure 3:
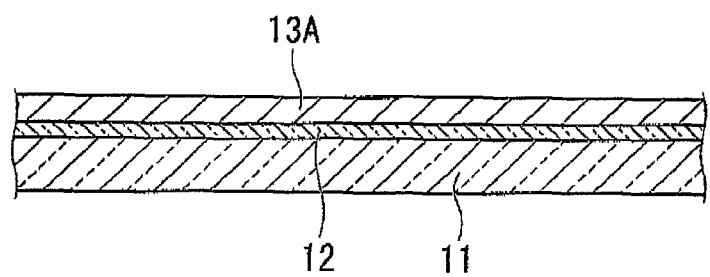
FIG. 3 is a sectional view showing a next step (a second step) of FIG. 2.
Figure 4:
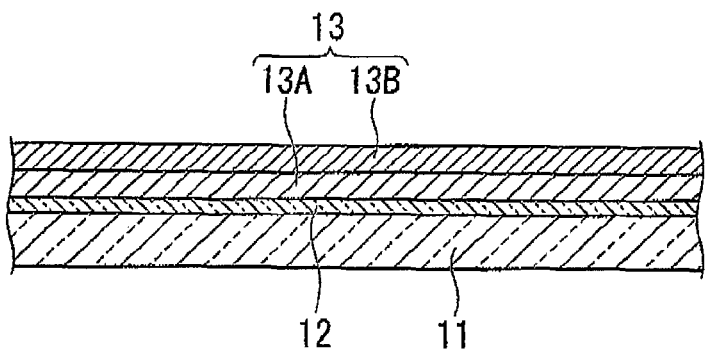
FIG. 4 is a sectional view showing a next step (a third step) of FIG. 3.

Next, as shown in FIGS. 3 and 4, on the transparent conductive film 12 of the conductive substrate for the photo electrode, the porous oxide semiconductor layer 13 having a first porous oxide semiconductor layer 13A and a second porous oxide semiconductor layer 13B is formed. As the forming method of the porous oxide semiconductor layer 13, for example, powder of titanium dioxide ($TiO_2$) is mixed with a disperse medium to prepare a paste, and the paste is then applied on the transparent conductive film 12 by methods such as a screen printing method, inkjet printing method, roll coating method, doctor blade method, and spin coating method, and is calcined. The porous oxide semiconductor layer 13 is formed in a thickness of about 5 μm to 30 μm.

Figure 5:
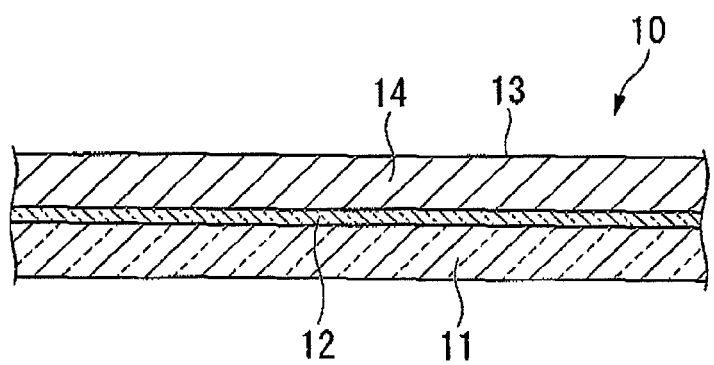
FIG. 5 is a sectional view showing a next step (a fourth step) of FIG. 4.

Then, as shown in FIG. 5, a sensitizing dye 14 is supported on and among particles of the porous oxide semiconductor layer 13, thereby constructing the first electrode 10 functioning as a photo electrode. Support of the sensitizing dye 14 may be achieved, for example, by dipping the conductive substrate on which the porous oxide semiconductor layer 13 is formed into a dye solution.

Next, a manufacturing method of the second electrode 20 will be described.

Figure 6:
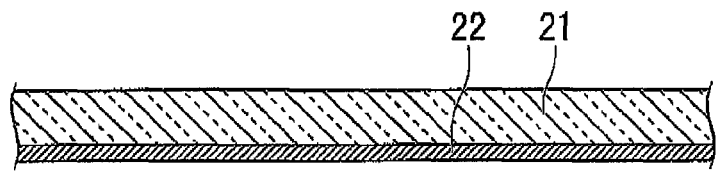
FIG. 6 is a sectional view showing a first step for manufacturing a second electrode (or a counter electrode) composing the wet type solar cell shown in FIG. 1.

As shown in FIG. 6, the second base material 21 made of plastic, glass, or the like is prepared, and the conductive layer 22 is provided on one surface of the second base material 21. As the forming method of the conductive layer 22, in the same manner as the first base material 11, known methods may be suitably used according to the materials of the conductive layer 22. For example, a membrane of an oxide semiconductor such as Fluorine-doped-Tin-Oxide (FTO) may be formed by a sputtering method, CVD method (chemical vapor deposition method), SPD method (spray pyrolysis deposition method), deposition method, and the like.

If the conductive layer 22 is too thick, the optical transparency deteriorates, while if the conductive layer 22 is too thin, the conductivity deteriorates. Therefore, taking both the optical transparency and the conductivity into account, the conductive layer 22 is preferably formed with a thickness of about 0.01 μm to 1 μm.

Subsequently, a resist is formed on the film-formed conductive layer 22 by a screen printing method or the like, and then, the resist is etched to form a unit cell pattern with a required shape.

The conductive substrate for the counter electrode is thus constructed.

Figure 7:
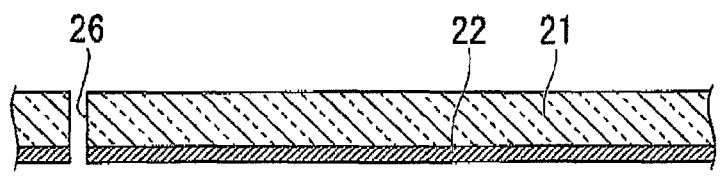
FIG. 7 is a sectional view showing a next step (a second step) of FIG. 6.

Next, as shown in FIG. 7, an electrolyte injection hole 26 for injecting the electrolyte 30 is formed in the conductive substrate for the counter electrode. The electrolyte injection hole 26 is provided, for example, by a drill or the like so as to reach the cell portion.

Figure 8:
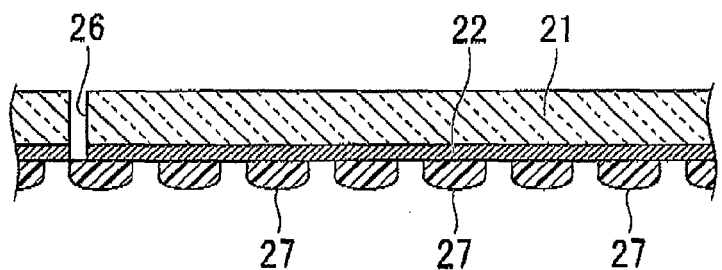
FIG. 8 is a sectional view showing a next step (a third step) of FIG. 7.

Next, as shown in FIG. 8, sump portion forming resins 27, which will be a mold of the void spaces, are patterned on the conductive substrate for the counter electrode. As the sump portion forming resin 27, for example, polyolefin resin ink may be used, and the sump portion forming resin 27 may be is formed by a screen printing method or the like. The size of the sump portion forming resin 27 is about 0.5 mm to 5 mm in width, and 0.2 mm to 2 mm in thickness. Also, the sump portion forming resin 27 may be formed in a linear shape or a point-like shape.

Figure 9:
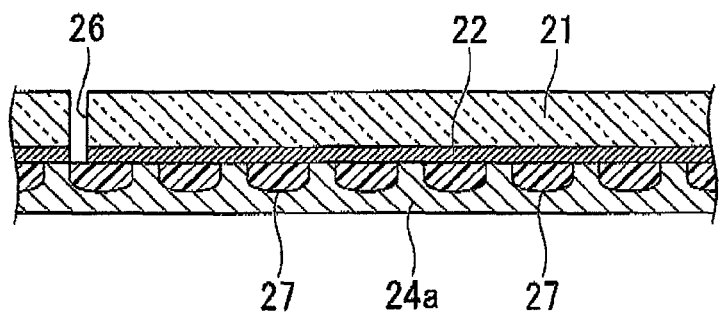
FIG. 9 is a sectional view showing a next step (a fourth step) of FIG. 8.

Subsequently, as shown in FIG. 9, a conductive porous paste 24a, which is formed by adding a small amount of inorganic adhesive to glass micro beads on whose surface an FTO film is formed by an SPD method, is applied on the sump portion forming resins 27 so that the sump portion forming resins 27 are covered and buried completely, and is then cured.

Figure 10:
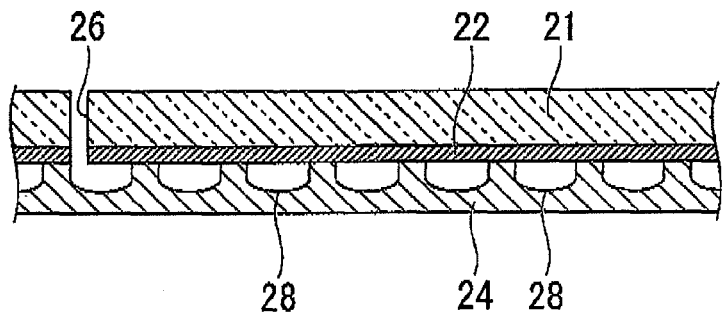
FIG. 10 is a sectional view showing a next step (a fifth step) of FIG. 9.

Further, as shown in FIG. 10, the sump portion forming resins 27 are then removed by being burnt at a temperature of 500° C., thereby forming sump portion forming recessed portions 28 in the predetermined positions of the conductive porous portion 24.

Figure 11:
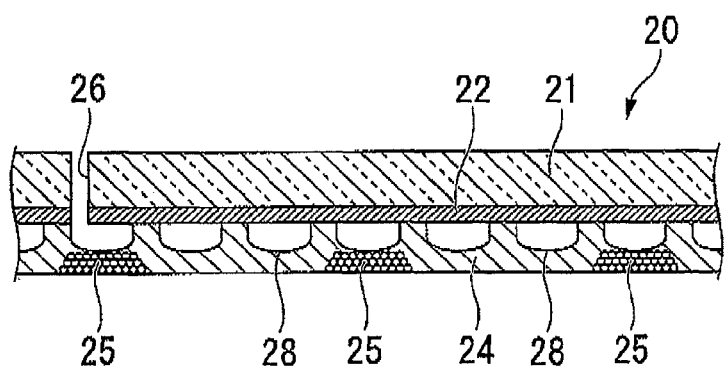
FIG. 11 is a sectional view showing a next step (a sixth step) of FIG. 10.
Figure 12:
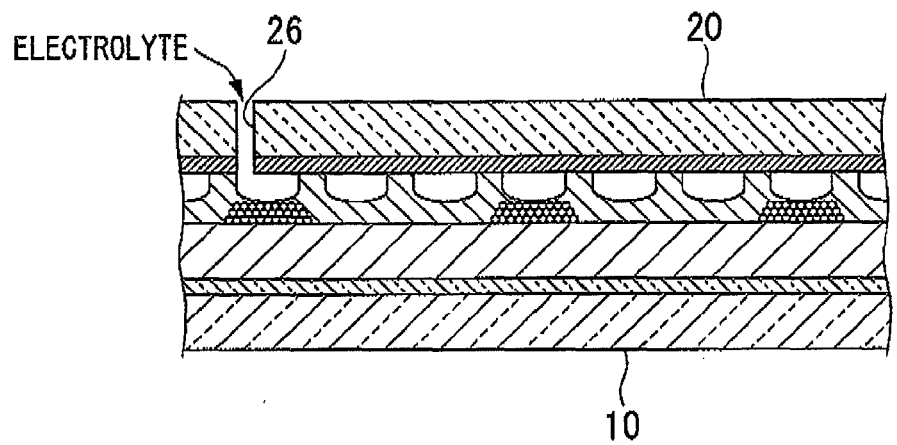
FIG. 12 is a sectional view showing a step for manufacturing the wet type solar cell shown in FIG. 1.

Subsequently, as shown in FIG. 11, a paste composed of titanium oxide particles of 400 nm, for example, is patterned in a grid shape on the surface of the conductive porous portion 24, and is then burnt to form the capillary structural portions 25.

Then, a platinum membrane as a catalyst of the counter electrode is sputtered on the surface of the conductive porous portion 24. The second electrode 20 functioning as the counter electrode is thus constructed.

Next, as shown in FIG. 12, the conductive substrate for the first electrode 10 shown in FIG. 5 and the conductive substrate for the second electrode 20 shown in FIG. 11 are disposed in a manner in which the porous oxide semiconductor layer 13 provided on the first electrode 10 and the conductive porous portion 24 provided on the second electrode 20 oppose each other. Then, the second electrode 20 is put on top of the first electrode 10, and the surrounding thereof is sealed up by, for example, an UV-curable adhesive (not shown).

After that, the electrolyte 30 is injected to the space between the first electrode 10 and the second electrode 20 from the electrolyte injection hole 26 provided in the second electrode 20, and then the electrolyte injection hole 26 is sealed by using a sealing agent formed of, for example, an UV-curable adhesive, thereby forming the photoelectric conversion element 1 shown in FIG. 1.

With such a structure described above, a photoelectric conversion element having a structure in which the sump portions 23 for the electrolyte 30 formed respectively of a recessed portion are provided at least on a part of the conductive porous portion 24 disposed between the first electrode 10 and the second electrode 20 can be manufactured.

Second Embodiment

Next, another example of the photoelectric conversion element of the present invention will be described in accordance with FIGS. 13 through 16.

Figure 13:
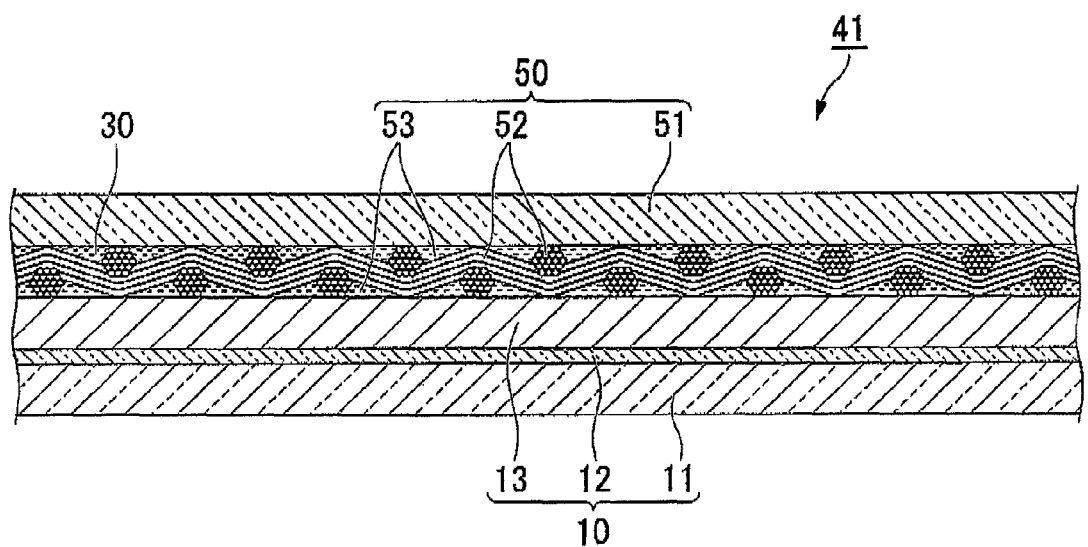
FIG. 13 is a sectional view illustrating another example (a second structure) of a wet type solar cell according to the present invention.

FIG. 13 is a schematic sectional view illustrating another example (a second structure) of a photoelectric conversion element according to the present invention.

As shown in FIG. 13, a photoelectric conversion element (or a wet type solar cell) 41 according to the present embodiment includes a first electrode 10 having a porous oxide semiconductor layer (also referred to as "oxide electrode") 13 which supports a sensitizing dye on a surface of it, and functioning as a photo electrode (also referred to as "working electrode"), a second electrode 50 disposed so as to oppose the first electrode 10, and an electrolyte 30 disposed at least in a part of the space between the two electrodes. Further, the photoelectric conversion element 41 is structured with sump portions 53 which are composed respectively of a void space formed between conductive layers of a mesh conductor 52.

In the present embodiment, the same reference numerals are used to designate elements which are the same as those of the photoelectric conversion element of the first embodiment shown in FIG. 1, and detailed description thereof will be omitted.

The second electrode 50 is structured with, for example, a dense second base material 51 and the mesh conductor 52 on the surface of which a catalyst of the counter electrode made of metal such as platinum is supported.

Since the second base material 51 composing the second electrode 50 does not necessarily possess optical transparency, materials forming the second base material 51 are not limited. As the second base material 51, while a glass plate or a plastic plate may be used in the same manner as the first base material 11, a metal plate of titanium or the like, which has an advantage of securing directly the conductivity with the outside, may also be used. While a glass plate is generally used as the second base material 51, a plastic film sheet such as a polyethylene terephthalate (PET), a polyethylene naphthalate (PEN), and a polycarbonate (PC), or a polished plate of ceramics such as a titanium oxide and an alumina may be used besides the glass plate. The mesh conductor 52 described later is provided on the second base material 51.

The mesh conductor 52 is an electrode generating an electromotive force between the first electrode 10 and itself. Moreover, it is preferable that at least a part of the mesh conductor 52 be of a capillary structure. The capillary structure is composed of a conductive mesh weaved with use of a bundle of stranded extra fine wires.

The electrolyte 30 is then injected to the space between the first electrode 10 and the second electrode 50. By having the capillary structure, the electrolyte 30 can be held.

The photoelectric conversion element 41 constructed as described above has a structure in which at least in a part of the second electrode 50, the mesh conductor 52 is disposed and the sump portions 53 for the electrolyte 30 are provided.

Accordingly, the photoelectric conversion element 41 is free from being bulky and becomes easier to be handled, so that space-saving at the time of installation of the DSC can be achieved. Moreover, by using surface tension which is hardly affected by the setting direction of the cell as a driving force, air bubbles entrapped in the space between the first electrode 10 and the second electrode 50 can be effectively exhausted from the power generating area. The air bubbles are led into the mesh clearances, so that the air bubbles generated in the power generating area can be easily removed. Accordingly, it is possible to form a photoelectric conversion element possessing both a superior power generation property and a long-term durability.

Next, an example of manufacturing methods of the photoelectric conversion element (the second structure) 41 according to the present invention will be described.

Figure 14:
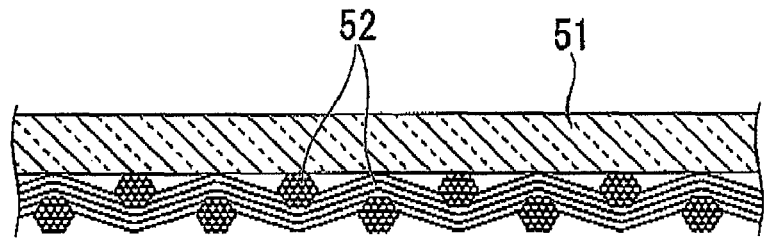
FIG. 14 is a sectional view showing a first step for manufacturing a second electrode (or a counter electrode) composing the wet type solar cell shown in FIG. 13.
Figure 15:
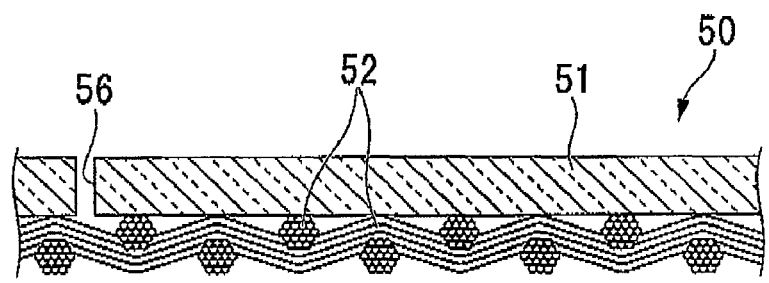
FIG. 15 is a sectional view showing a next step (a second step) of FIG. 14.
Figure 16:
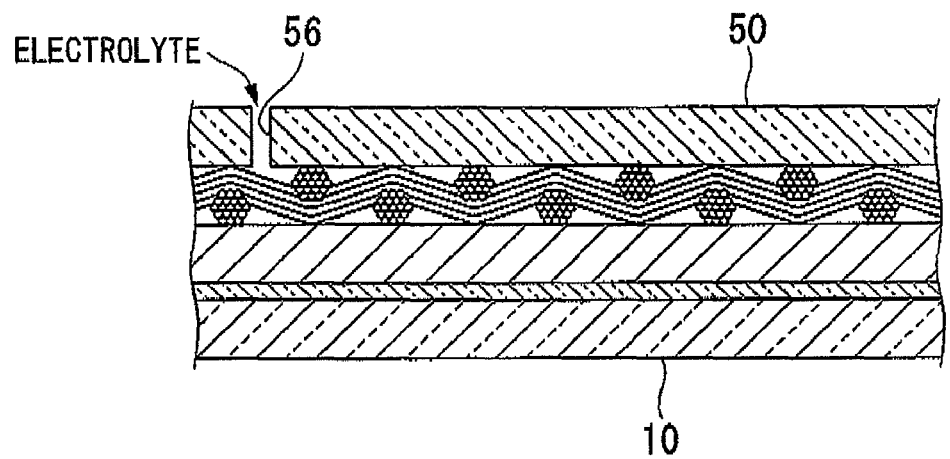
FIG. 16 is a sectional view showing a step for manufacturing the wet type solar cell shown in FIG. 13.

FIGS. 14 and 15 show steps in the sequence for manufacturing the second electrode 50 functioning as the counter electrode in the photoelectric conversion element of the present embodiment, and FIG. 16 is a schematic sectional view showing a step for manufacturing the photoelectric conversion element 41 of the present invention by laminating the first electrode 10 and the second electrode 50 and then by jointing them.

Since the manufacturing steps of the first electrode 10 functioning as a photo electrode in the photoelectric conversion element of the present embodiment are the same as those of the photoelectric conversion element of the first structure shown in FIGS. 2 through 5, detailed description thereof will be omitted.

The manufacturing method of the second electrode 50 will be described.

As shown in FIG. 14, the second base material 51 made of plastic, glass, or the like, and a metal mesh (or the mesh conductor) 52 of titanium or the like formed by weaving a bundle of stranded extra fine wires are prepared. They construct the conductive substrate for the counter electrode.

Next, as shown in FIG. 15, an electrolyte injection hole 56 for injecting the electrolyte 30 is formed in the second base material 51 constructing the conductive substrate for the counter electrode. The electrolyte injection hole 56 is provided, for example, by using a drill or the like so as to reach the cell portion.

Then, a platinum membrane as a catalyst of the counter electrode is sputtered on the surface of the metal mesh 52. The second electrode 50 functioning as the counter electrode is thus constructed.

Next, as shown in FIG. 16, the conductive substrate for the first electrode 10 shown in FIG. 5 and the conductive substrate for the second electrode 50 shown in FIG. 15 are disposed in a manner in which the porous oxide semiconductor layer 13 provided on the first electrode 10 and the metal mesh 52 provided on the second electrode 50 oppose each other. Then, the second electrode 50 is put on top of the first electrode 10, and the surrounding thereof is sealed up by, for example, an UV-curable adhesive (not shown).

After that, the electrolyte 30 is injected to the space between the first electrode 10 and the second electrode 50 from the electrolyte injection hole 56 provided in the second electrode 50, and then the electrolyte injection hole 56 is sealed by using a sealing agent formed of, for example, an UV-curable adhesive, thereby forming the photoelectric conversion element 41 shown in FIG. 13.

With such a structure described above, a photoelectric conversion element having a structure in which the sump portions 53 for the electrolyte 30 are provided at least in a part of the space between the first electrode 10 and the metal mesh (or the mesh conductor) 52 provided on the second electrode 50 can be manufactured.

Third Embodiment

Next, still another example of the photoelectric conversion element of the present invention will be described in accordance with FIGS. 17 through 21.

Figure 17:
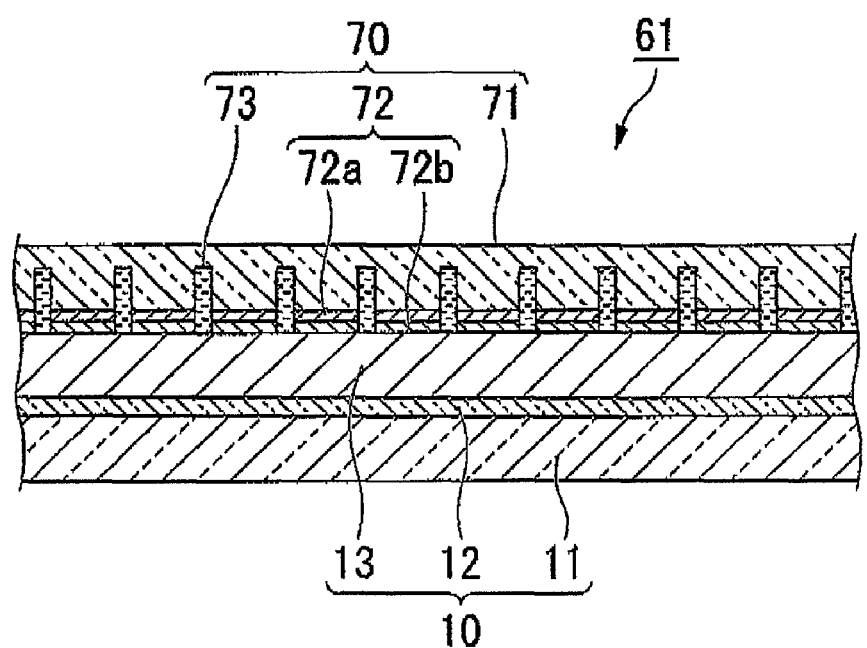
FIG. 17 is a sectional view illustrating another example (a third structure) of a wet type solar cell according to the present invention.

FIG. 17 is a schematic sectional view illustrating another example (a third structure) of a photoelectric conversion element according to the present invention.

As shown in FIG. 17, a photoelectric conversion element (or a wet type solar cell) 61 according to the present embodiment includes a first electrode 10 having a porous oxide semiconductor layer (also referred to as "oxide electrode") 13 which supports a sensitizing dye on a surface of it, and Rationing as a photo electrode (also referred to as "working electrode"), a second electrode 70 disposed so as to oppose the first electrode 10, and an electrolyte 30 disposed in at least a part of the space between the two electrodes. Further, the photoelectric conversion element 61 is structured in a manner in which sump portions 73 composed respectively of a recessed portion made of a hole or a slot formed on the inner surface side of a second base material 71 constructing the second electrode 70 are provided in at least a part of the space between the first electrode 10 and the second electrode 70.

In the present embodiment, the same reference numerals are used to designate elements which are the same as those of the photoelectric conversion element of the first embodiment shown in FIG. 1, and detailed description thereof will be omitted.

The second electrode 70 is structured with the second base material 71, and a catalyst layer of the counter electrode 72 including a conductive layer 72a disposed on top of the second base material 71 and a catalyst layer 72b disposed on top of the conductive layer 72a. As shown in FIG. 17, the conductive layer 72a is provided on the side contacting the second base material 71 to secure the adhesion and the conductivity. On the other hand, the catalyst layer 72b functions to give a catalytic activity for improving the speed of exchanging charge with the electrolyte layer.

Since the second base material 71 does not necessarily possess optical transparency, materials forming the second base material 71 are not limited. As the second base material 71, while a glass plate or a plastic plate may be used in the same manner as the first base material 11, a metal plate of titanium or the like may be used preferably since such a metal plate has advantages of securing directly the conductivity with the outside and of having an excellent workability for the recessed portions as described later.

As the catalyst layer 72b, while a layer of carbon, platinum, and the like, which is heat-treated after deposition, sputtering, or application of chloroplatinic acid, may be used preferably, materials and/or methods thereof are not limited in particular as long as the resulting layer functions as an electrode.

The electrolyte 30 is then injected to the space between the first electrode 10 and the second electrode 70.

The photoelectric conversion element 61 constructed as described above has a structure in which the sump portions 73 composed respectively of a recessed portion made of a hole or a slot formed within the second electrode 70 are provided in at least a part of the space between the first electrode 10 and the second electrode 70.

Accordingly, the photoelectric conversion element 61 is free from being bulky and becomes easier to be handled, so that space-saving at the time of installation of the DSC can be achieved. Moreover, by using surface tension which is hardly affected by the setting direction of the cell as a driving force, air bubbles entrapped in the space between the first electrode 10 and the second electrode 70 can be effectively exhausted from the power generating area. The air bubbles are led into the recessed portions, so that the air bubbles generated in the power generating area can be easily removed. Accordingly, it is possible to obtain the formation of a photoelectric conversion element possessing both a superior power generation property and a long-term durability.

Next, an example of manufacturing methods of the photoelectric conversion element (the third structure) 61 according to the present invention will be described.

Figure 18:
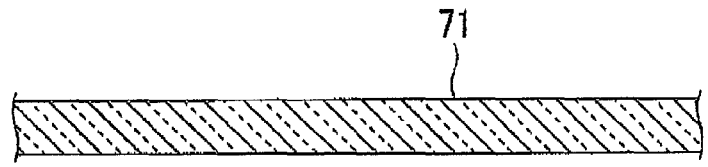
FIG. 18 is a sectional view showing a first step for manufacturing a second electrode (or a counter electrode) composing the wet type solar cell shown in FIG. 17.
Figure 19:
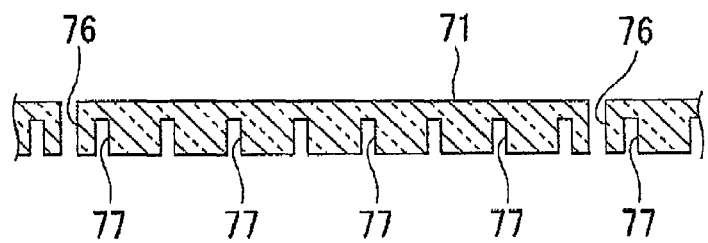
FIG. 19 is a sectional view showing a next step (a second step) of FIG. 18.
Figure 20:
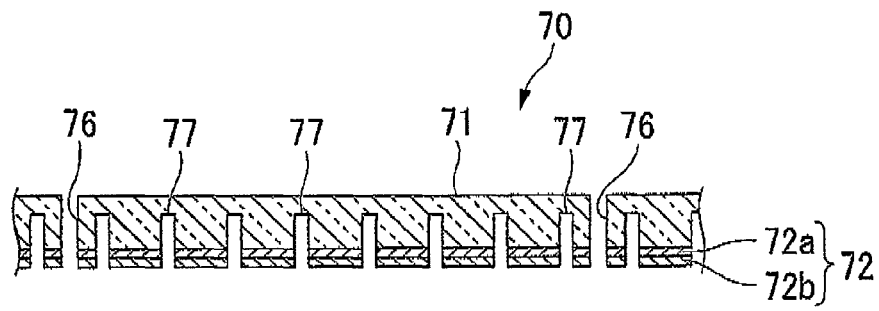
FIG. 20 is a sectional view showing a next step (a third step) of FIG. 19.
Figure 21:
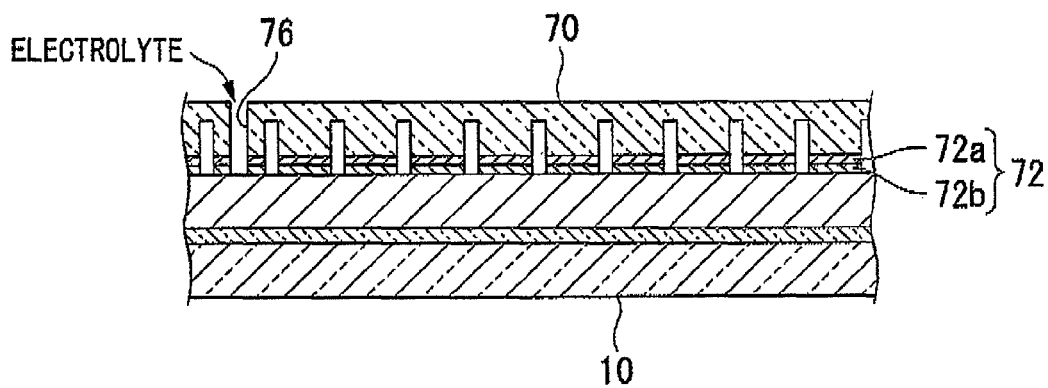
FIG. 21 is a sectional view showing a step for manufacturing the wet type solar cell shown in FIG. 17.

FIGS. 18 through 20 show steps in the sequence for manufacturing the second electrode 70 functioning as the counter electrode in the photoelectric conversion element of the present embodiment, and FIG. 21 is a schematic sectional view showing a step for manufacturing the photoelectric conversion element 61 of the present invention by laminating the first electrode 10 and the second electrode 70 and then by joining them.

Since the manufacturing steps of the first electrode 10 functioning as a photo electrode in the photoelectric conversion element of the present embodiment are the same as those of the photoelectric conversion element of the first structure shown in FIGS. 2 through 5, detailed description thereof will be omitted.

The manufacturing method of the second electrode 70 will be described.

As shown in FIG. 18, the second base material 71 made of metal such as titanium is prepared.

Next, as shown in FIG. 19, in the second base material 71 constructing the conductive substrate for the counter electrode, not only electrolyte injection holes 76 for injecting the electrolyte 30 are formed at two places, but also, for example, holes with a diameter of 400 μm and a depth of 2 mm are formed as sump portion forming recessed portions 77 with a density of 9 places/cm$^2$. The electrolyte injection holes 76 and the sump portion forming recessed portions 77 are provided, for example, by using a drill or the like, and the electrolyte injection holes 76 are provided so as to reach the cell portion.

Then, as shown in FIG. 20, a platinum membrane as a catalyst of the counter electrode is sputtered on the surface of the second base material 71 to form the catalyst layer of the counter electrode 72, thereby forming the second electrode 70 functioning as the counter electrode.

Next, as shown in FIG. 21, the conductive substrate for the first electrode 10 shown in FIG. 5 and the conductive substrate for the second electrode 70 shown in FIG. 20 are disposed in a manner in which the porous oxide semiconductor layer 13 provided on the first electrode 10 and the sump portion forming recessed portions 77 provided on the second electrode 70 oppose each other. Then, the second electrode 70 is put on top of the first electrode 10, and the surrounding thereof is sealed up by, for example, an UV-curable adhesive (not shown).

After that, the electrolyte 30 is injected to the space between the first electrode 10 and the second electrode 70 from the electrolyte injection holes 76 provided in the second electrode 70, and then the electrolyte injection holes 76 are sealed by using a sealing agent formed of, for example, an UV-curable adhesive, thereby forming the photoelectric conversion element 61 shown in FIG. 17.

With such a structure described above, a photoelectric conversion element having a structure in which the sump portions 73 for the electrolyte 30 composed respectively of a recessed portion made of a hole or a slot formed within the second electrode 70 are provided in at least a part of the space between the first electrode 10 and the second electrode 70 can be manufactured.

Examples 1 through 3

The present invention will be described more specifically with reference to the following Examples. However, the present invention is not limited to these Examples.

First of all, a conductive glass substrate (size: 100 mm square, thickness: 1 mm) formed by providing a transparent conductive film on one surface of a glass (a first base material) was prepared as a transparent substrate for a first electrode (referred to as "photo side substrate" hereinafter), which is commonly used in each of the following Examples.

Then, on the transparent conductive film just having been formed, a paste composed of titanium oxide having a particle diameter of 15 nm was applied in a thickness of 15 μm by screen printing, and then sintered at a temperature of 450° C. to produce a first porous oxide semiconductor layer.

Subsequently, on the first porous oxide semiconductor layer, a paste composed of titanium oxide having a particle diameter of 400 nm was applied in a thickness of 15 μm by screen printing, and then sintered at temperature of 450° C. to produce a second porous oxide semiconductor layer.

After that the photo side substrate, on which a porous oxide semiconductor layer including the first porous oxide semiconductor layer and the second porous oxide semiconductor layer was formed, was dipped into a dye solution to support a sensitizing dye on the surface of the titanium oxide porous film, thereby forming the first electrode.

On the other hand, an FTO transparent conductive glass plate (a second base material with size: 100 mm square, and thickness: 1 mm) was prepared as a transparent substrate for a second electrode (referred to as "counter electrode substrate" hereinafter) used in Example 1.

Then, an injection hole for injecting an electrolyte was formed in the counter electrode substrate.

Subsequently, a resin which would be mold of a void space was patterned on the counter electrode substrate, a paste which was formed by adding a small amount of inorganic adhesive to glass micro beads, on whose surface an FTO film was formed by an SPD method, was applied on the resin so that the resin was covered and buried completely, and was cured, and then the resin mold was removed at a temperature of 500° C.

Further, a paste composed of titanium oxide particles of 400 nm was patterned in a grid shape on the surface of the counter electrode substrate, and was burnt, and then a conductive film made of platinum was formed on the surface by a sputtering method, thereby forming the second electrode.

Then, the porous oxide semiconductor layer provided on the first electrode and the conductive film provided on the second electrode were disposed so that they oppose each other, and the surrounding thereof was sealed up by using a sealing agent composed of an UV-curable adhesive.

Thereafter, an electrolyte was injected to the space between the first electrode and the second electrode from the injection hole formed in the counter electrode substrate, and the electrolyte injection hole was sealed up by using a sealing agent composed of an UV-curable adhesive to prepare the photoelectric conversion element of the first structure according to the embodiments of the present invention.

Moreover, a glass plate (a second base material with size: 100 mm square, and thickness: 1 mm) and a mesh of titanium formed by weaving a bundle of stranded extra fine wires were prepared for a transparent substrate for a second electrode (referred to as "counter electrode substrate" hereinafter) used in Example 2.

Then, an injection hole for injecting an electrolyte was formed in the glass plate constructing the counter electrode substrate.

Subsequently, on the surface of the mesh of titanium constructing the counter electrode substrate, a conductive film made of platinum was formed by a sputtering method to form the second electrode.

Then, the porous oxide semiconductor layer provided on the first electrode and the mesh of titanium provided on the second electrode were disposed so that they oppose each other, and the surrounding thereof was sealed up by using a sealing agent composed of an UV-curable adhesive.

Thereafter, an electrolyte was injected to the space between the first electrode and the second electrode from the injection hole formed in the counter electrode substrate, and the electrolyte injection hole was sealed up by using a sealing agent composed of an UV-curable adhesive to prepare the photoelectric conversion element of the second structure according to the embodiments of the present invention.

Furthermore, a titanium plate (a second base material with size: 100 mm square, and thickness: 1 mm) was prepared as a transparent substrate for a second electrode (referred to as "counter electrode substrate" hereinafter) used in Example 3.

Then, in the counter electrode substrate, electrolyte injection holes for injecting an electrolyte were formed at two places, and holes with a diameter of 400 μm and a depth of 2 mm were formed with a density of 9 places/cm$^2$.

Next, a conductive film made of platinum was formed on the surface of the counter electrode substrate by a sputtering method, thereby forming the second electrode.

Subsequently, the porous oxide semiconductor layer provided on the first electrode and the conductive film provided on the second electrode were disposed so that they oppose each other, and the surrounding thereof was sealed up by using a sealing agent composed of an UV-curable adhesive.

Thereafter, an electrolyte was injected to the space between the first electrode and the second electrode from the injection holes formed in the counter electrode substrate, and the electrolyte injection holes were sealed up by using a sealing agent composed of an UV-curable adhesive to prepare the photoelectric conversion element of the third structure according to the embodiments of the present invention.

Comparative Example 1

For Comparative Example 1, a conductive glass substrate (size; 100 mm square, and thickness: 1 mm) formed by providing a transparent conductive film on one surface of glass (a first base material) was prepared as a transparent substrate for a first electrode (referred to as "photo side substrate" hereinafter).

Then, on the transparent conductive film just having been formed, a paste composed of titanium oxide was applied in a thickness of 10 μm by screen printing, and then sintered at a temperature of 450° C. to produce a porous oxide semiconductor layer made of titanium oxide.

Subsequently, the photo side substrate, on which the porous oxide semiconductor layer was formed, was dipped into a dye solution to support a sensitizing dye on the surface of the titanium oxide porous film, thereby forming the first electrode.

On the other hand, a titanium plate (a second base material with size: 100 mm square, and thickness: 1 mm) was prepared as a transparent substrate for a second electrode (referred to as "counter electrode substrate" hereinafter).

Then, an injection hole for injecting an electrolyte was formed in the counter electrode substrate.

Subsequently, a conductive film made of platinum was formed on the surface of the counter electrode substrate by a sputtering method, thereby forming the second electrode.

Then, the porous oxide semiconductor layer provided on the first electrode and the conductive film provided on the second electrode were disposed so that they oppose each other, and the surrounding thereof was sealed up by using a sealing agent composed of an UV-curable adhesive.

Thereafter, an electrolyte was injected to the space between the first electrode and the second electrode from the injection hole formed in the counter electrode substrate, and the electrolyte injection hole was sealed up by using a sealing agent composed of an UV-curable adhesive to prepare a photoelectric conversion element according to the comparative example of the present invention.

Then, life duration properties of each of the photoelectric conversion elements for Examples 1 to 3 and of the photoelectric conversion element for Comparative Example 1, which were prepared respectively as described above, were evaluated, where the life duration was defined to represent a point in time when a short-circuit current of each element declines 20% from the initial value. The properties were evaluated continuously by using a solar simulator with a thermostat which could keep the temperature at 65° C.

Evaluation of the properties was carried out in 5 different setting cases, that is, cases in which each one of four sides (top, bottom, right, and left) of the cell was set on the top, and a case in which the cell was set horizontally. Then, a measured result of a setting case with the worst property was adopted. The measured values are shown in Table 1.

TABLE 1

|  | Life Duration [hr] |
| --- | --- |
| Example 1 (First Structure) | 2000 |
| Example 2 (Second Structure) | 2000 |
| Example 3 (Third Structure) | 1000 |
| Comparative Example 1 (Conventional Structure) | 500 |

As seen from the results shown in Table 1, the obtained results of measurements indicate that life duration is remarkably extended in each of the photoelectric conversion elements of Examples 1 to 3 of the present invention, and is two to four times longer than that in the photoelectric conversion element of Comparative Example 1.

Therefore, the present invention can provide an excellent photoelectric conversion element which is hardly affected by the setting direction of the cell, and can effectively exhaust air bubbles from the power generating area, thereby possessing a superior power generation property and a long-term durability.

Moreover, since the present invention adopts a sealing technique using resin in order to prevent leakage and volatilization of electrolyte, the photoelectric conversion element of the present invention possesses sufficient workability.

Fourth Embodiment

Next, still another example of the photoelectric conversion element of the present invention will be described in accordance with FIGS. 22 through 26.

Figure 22:
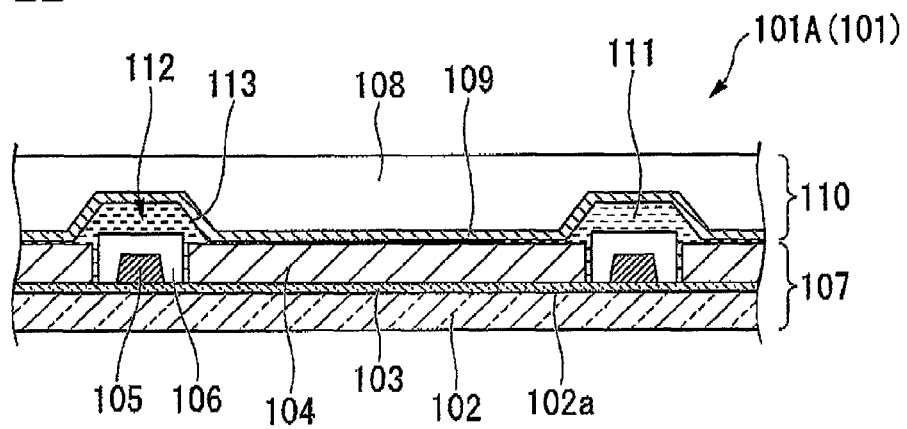
FIG. 22 is a schematic sectional view illustrating another example (a fourth structure) of a photoelectric conversion element according to the present invention.

FIG. 22 is a sectional view illustrating still another example (the fourth structure) of the photoelectric conversion element according to the present invention.

A photoelectric conversion element 101A (101) according to the present embodiment includes: a working electrode (a first electrode) 107 having a transparent insulating first base material 102, a porous oxide semiconductor layer 104 disposed on one surface 102a of the first base material 102 via a transparent conductive film 103 disposed therebetween and supporting a sensitizing dye at least on a part of a surface of the layer, and a collector wiring 105 composed of a conductive material; a counter electrode (a second electrode) 110 having a conductive second base material 108 and disposed in a position opposing the porous oxide semiconductor layer 104 of the working electrode 107; and an electrolyte 111 disposed in at least a part of a space between the working electrode 107 and the counter electrode 110.

The photoelectric conversion element 101 of the present embodiment is provided with a sump portion 112 in the vicinity of the collector wiring 105 (or around the collector wiring 105).

When dye-sensitized photoelectric conversion elements are used at a high temperature for a long period, air bubbles are generated within the cell due to a leakage and/or the volatilization of the electrolyte, and/or pressure changes inside the cell. The air bubbles tend to be generated not only in the vicinity of the sealants but everywhere. At the part where the air bubbles are generated, charge transfer is not carried out properly so that power generation property deteriorates, and cell failure will be caused since decomposition of sensitizing dye or the like occurs.

In the photoelectric conversion element 101 of the present embodiment, since the sump portion 112 is provided in the vicinity of the collector wiring 105, the sump portion can take in the air bubbles generated within the cell and exhaust them effectively. As a result, the photoelectric conversion element can possess long life duration.

The present invention utilizes "surface tension of air bubbles," whose driving force is stronger than that of buoyancy of the air bubbles, and which is hardly affected by the setting direction of the cell, to exhaust the air bubbles securely from the power generating area to the sump portion 112, and to supply the electrolyte 111 kept in the sump portion 112 automatically, so that a long-term durability can be improved. Moreover, the structure of the present invention is also effective in exhausting air bubbles which have been entrapped from the beginning due to mistakes on assembling or the like.

The sump portion 112 is, for example, a recessed portion 113 provided on the second base material 108 constructing the counter electrode 110. With this simple structure, the sump portion 112 can easily take in air bubbles.

It is preferable that a plurality of the recessed portions 113 be provided in continuous arrangement along the collector wiring 105. Since air bubbles tend to be generated at one place intensively, the recessed portions 113 provided in continuous arrangement for a certain area can effectively take in the air bubbles.

Moreover, the depth of the recessed portion 113 preferably ranges from 0.05 mm to 1 mm. If the depth is less than the lower limit the holding amount of the electrolyte 111 becomes too little. On the other hand, if the depth exceeds the upper limit, the electrolyte 111 may be maldistributed due to gravity when the cell is set up vertically, so that it is necessary to provide a separate gravity-feed sump portion.

The amount of electrolyte reserved in the recessed portion 113 is designed so as to be at least 5% or more of the amount of electrolyte injected into the entire cell. If the electrolyte leaks out in large quantities, the electrolyte composition is largely modified due to the volatility difference among electrolyte components, and the property deteriorates from that of the original even if the electrolyte is re-injected. Thus, about 20 volume % of the amount of electrolyte is enough at the maximum.

Further, a capillary structure 114 (also referred to as "capillary" hereinafter) may be provided at least above the collector wiring 105 in the recessed portion 113 within the range without reducing the reserved amount of electrolyte for electrolyte transfer or without obstructing the transfer of air bubbles, as a photoelectric conversion element 101B (101) shown in FIG. 23. On that occasion, it is necessary for the capillary 114 to be connected with the porous oxide semiconductor layer 104 in order not to interfere with the transfer of air bubbles. By providing the capillary 114, it gets easier for the electrolyte 111 to penetrate due to capillary action.

As the capillary 114, although it is not limited in particular, for example, a bundle of extra fine wires, a mesh, or a porous formed by resin or glass on which hydrophilic treatment is applied, an oxide compound of ceramic or the like, metal with high chemical resistance such as titanium or niobium may be suggested.

Figure 24:
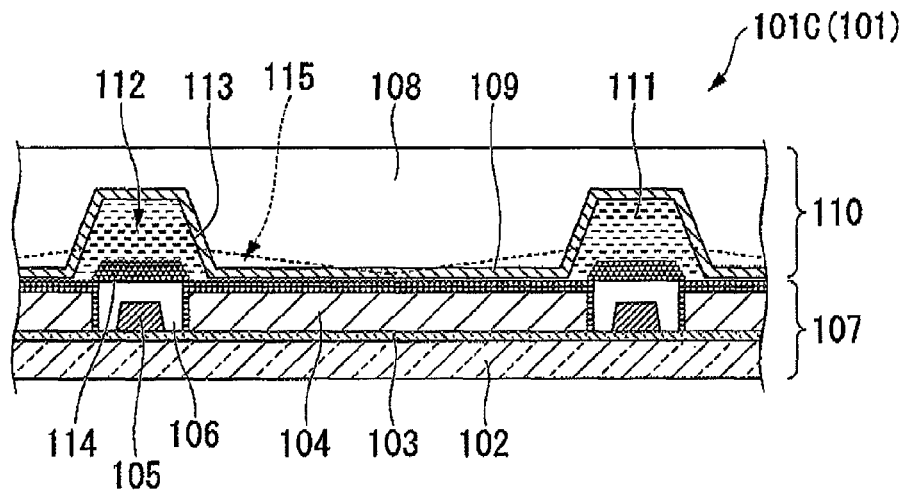
FIG. 24 is a schematic sectional view showing another example of a photoelectric conversion element according to the present invention.

Furthermore, as a photoelectric conversion element 101C (101) shown in FIG. 24, the capillary 114 and a light scattering film (a porous layer which is formed on the porous oxide semiconductor layer 104, and which scatters and reflects the light transmitted through the porous oxide semiconductor layer 104) may be used in combination.

An interval between the recessed portion 113 and another recessed portion 113 is preferably less than 2 cm. If the interval is 2 cm or more, it gets difficult to exhaust the air bubbles effectively.

Figure 23:
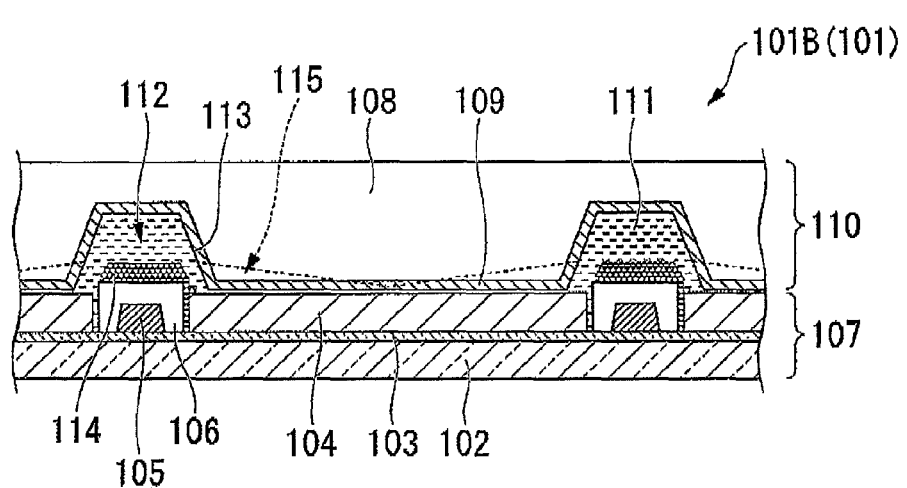
FIG. 23 is a schematic sectional view showing another example of a photoelectric conversion element according to the present invention.

When the interval between the two recessed portions 113 is 5 mm or more, it is preferable to provide grooves 115 with a depth of several μm to 150 μm and a width of several tens μm to several hundreds μm on the surface of the counter electrode 110 (the second base material 108) in the power generating area in order to induce the air bubbles, as the photoelectric conversion element 101B (101) shown in FIG. 23. In the power generating area except for the grooves 115, the clearance between the working electrode 107 (the first base material 102) and the counter electrode 110 (the second base material 108) is designed to be 150 μm or less. If possible, it is more preferable that the depth and the width of the groove 115 be inclined toward the closest recessed portion 113.

Figure 25:
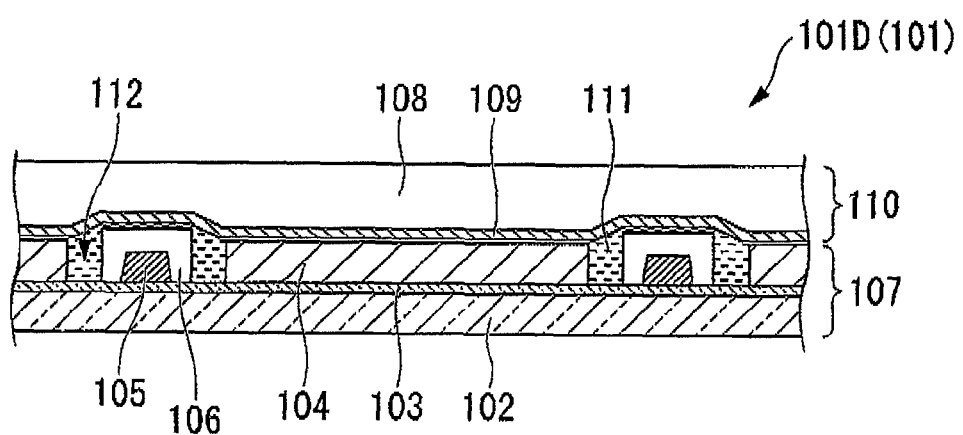
FIG. 25 is a schematic sectional view showing another example of a photoelectric conversion element according to the present invention.

While in the above-described examples, a case in which the sump portion 112 is formed of the recessed portion 113 provided on the second base material 108 has been illustrated, the present invention is not limited thereto, and as a photoelectric conversion element 101D (101) shown in FIG. 25, a space provided between the collector wiring 105 and the porous oxide semiconductor layer 104 in the working electrode 107 may be used as the sump portion 112. In this case, the collector wiring 105 should not be designed in a grid shape so that the sump portion 112 is not cut off. Furthermore, in this case as well, it is preferable that the amount of electrolyte reserved in this space (the sump portion 112) be 5% to 20% of the amount of electrolyte injected into the entire cell.

Figure 26:
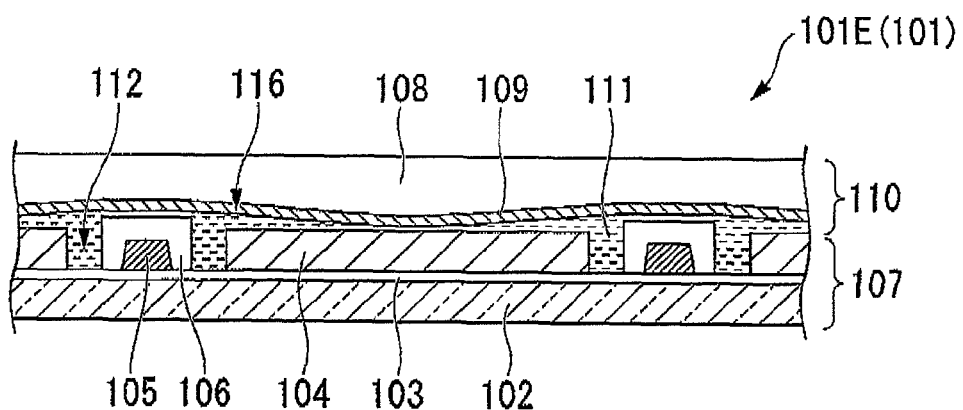
FIG. 26 is a schematic sectional view showing another example of a photoelectric conversion element according to the present invention.
Figure 27:
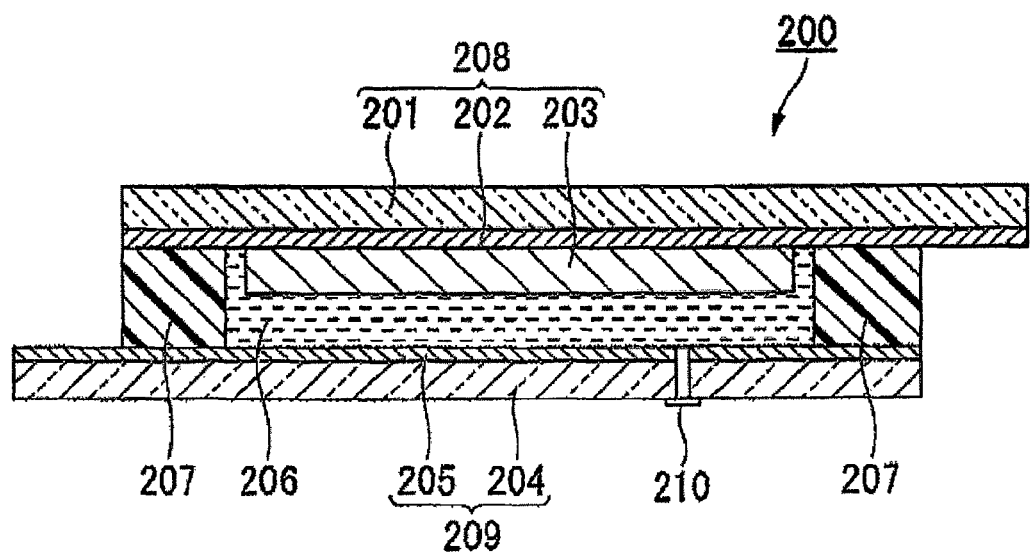
FIG. 27 is a sectional view illustrating a structure of a conventional wet type solar cell.

Still further, as a photoelectric conversion element 101E (101) shown in FIG. 26, without providing the groove 115, an inclined portion 116 inclined toward the collector wiring 105 may be provided on the second base material 108 so that the clearance between the working electrode 107 (the first base material 102) and the counter electrode 110 (the second base material 108) is wider around the sump portion 112 (in the vicinity of the sump portion 112) than in the other part. By providing the inclined portion 116, it is possible to prevent the convection of the air bubbles in the cell. In this case as well, the clearance between the working electrode 107 and the counter electrode 110 in the power generating area should not be more than 150 μm at the maximum.

The working electrode 107 is roughly structured with a transparent base material (the first base material 102), a transparent conductive film 103 formed on one surface 102a of the first base material 102, and a porous oxide semiconductor layer 104 on which a sensitizing dye is supported.

As the transparent base material, a substrate composed of an optically transparent material is used, and any material generally used as the transparent base material for the photoelectric conversion element 101 such as a glass, a polyethylene terephthalate, a polycarbonate, and a polyether sulfone may be used. Among these, a transparent base material is selected appropriately considering resistance to the electrolyte 111 and the like. For the transparent base material, a base material as superior as possible in optical transparency is preferable for its particular use, and a base material with the optical transparency of 90% or more is more preferable.

The transparent conductive film 103 is a membrane formed on one surface of the transparent base material in order to impart conductivity thereto. It is preferable for the transparent conductive film 103 to be a membrane made of a conductive metallic oxide in order to provide a structure in which the transparency of the transparent conductive substrate will not be damaged strikingly.

As the conductive metallic oxide forming the transparent conductive film 103, Indium-Tin-Oxide (ITO), Fluorine-doped-Tin-Oxide (FTO), tin oxide ($SnO_2$), and the like may be used.

Among these, from the view points of ease of film formation and low manufacturing cost, ITO and FTO are preferable. Further, the transparent conductive film 103 is preferably a monolayer made only by ITO, or a laminated layer formed by laminating a film made of FTO on a film made of ITO.

By preparing the transparent conductive film 103 as a monolayer made only by ITO, or as a laminated layer formed by laminating a film made of FTO on a film made of ITO, a transparent conductive substrate absorbing little light in the visible range and possessing a high conductivity can be structured.

The porous oxide semiconductor layer 104 is provided on the transparent conductive film 103, and supports a sensitizing dye on the surface thereof. A semiconductor forming the porous oxide semiconductor layer 104 is not limited in particular and a semiconductor of any kind may be used as long as it can normally be used to manufacture a porous oxide semiconductor for the photoelectric conversion element 101. For such a semiconductor, for example, titanium oxide ($TiO_2$), tin oxide ($SnO_2$), tungsten oxide ($WO_3$), zinc oxide (ZnO), niobium oxide ($Nb_2O_5$) and the like may be used.

As the method for forming the porous oxide semiconductor layer 104, a method, for example, in which additives such as polyethylene glycol are added, if necessary, to a dispersion liquid obtained by dispersing commercially available oxide semiconductor particles into a desired dispersion medium, or to a colloidal solution prepared by the sol-gel method, and the dispersion liquid or the colloidal solution is applied by a well-known application method such as a screen printing method, inkjet printing method, roll coating method, doctor blade method, and spray coating method, and then the additives are removed by heat-treatment to form void spaces, thereby making the porous portion, may be suitably adopted.

As the sensitizing dye, a ruthenium complex having a bipyridine structure, tert-pyridine structure or the like in the ligand, metal complex such as porphyrin and phthalocyanine, and organic dye such as eosin, rhodamine, and merocyanine may be suitably used. Among these, ones showing behavior suitable for the purpose and the semiconductor to be used may be selected without limiting in particular.

The collector wiring 105 is structured with, for example, a conductive film formed by applying a conductive paste containing conductive powder on a transparent substrate and then drying, a membrane made of metal or the like such as platinum and carbon, wiring formed by soldering, and the like. The collector wiring 105 is electrically connected with the transparent conductive film 103. Via the collector wiring 105, the layered product and an external connection terminal (not shown) can be electrically connected with each other.

A protective layer 106 composed of an insulator such as glass with a low melting point or insulating resin is disposed so as to coat the collector wiring 105. Since the protective layer 106 is provided between the collector wiring 105 and the electrolyte 111 in this way, the collector wiring 105 and the electrolyte 111 do not contact directly with each other. Accordingly, it is possible to prevent the collector wiring 105 from corroding caused by the contact with the electrolyte 111.

The counter electrode 110 is composed of the second base material 108 and a catalyst film 109 formed on one surface of the second base material 108.

As the second base material 108, those formed by providing a conductive film on the first base material 102, or those formed by providing a conductive film on a metal plate or a synthetic resin plate may be used since the second base material 108 does not necessarily possess optical transparency.

The catalyst film 109 is a membrane made of platinum, carbon or the like formed on one surface of the second base material 108 in order to give a catalytic activity to the second base material 108 for improving charge exchanging speed with the electrolyte. As the catalyst film 109, while a layer of carbon, platinum, and the like, which is heat-treated by deposition, sputtering, or application of chloroplatinic acid, may be used preferably, materials and/or methods thereof are not limited in particular as long as the resulting layer functions as an electrode.

The electrolyte 111 may be formed by dissolving electrolyte components such as iodine/iodide ion and tertiary-butyl pyridine in an organic solvent such as ethylene carbonate and methoxyacetonitrile.

In the photoelectric conversion element 101, a layered product formed by laminating the working electrode 107 and the counter electrode 110 with a predetermined space therebetween is bonded and integrated by sealing the surrounding thereof by a sealing member (not shown), and the electrolyte 111 is injected to the space between the working electrode 107 and the counter electrode 108, and then is sealed up, thereby functioning as a photoelectric conversion element.

The sealing member is not limited in particular as long as it possess an excellent adhesive property to the second base material 108 constructing the counter electrode 110. However, it is preferable to use adhesives, for example, made of thermoplastic resin having carboxylic acid groups in the molecular chain, and more specifically, Himilan (manufactured by DuPont-Mitsui Polychemicals Co., LTD), and Bynel (manufactured by DuPont-Mitsui Polychemicals Co., LTD) may be used preferably.

Example 4

A photoelectric conversion element shown in FIG. 22 was prepared (Example 4).

On a glass substrate (140 mm square), an FTO transparent conductive film was formed. On the transparent conductive film substrate, a porous oxide semiconductor layer composed of nanoparticles of $TiO_2$ was formed, To be more specific, on the transparent conductive film substrate, a paste composed of nanoparticles of $TiO_2$ having a particle diameter of 15 nm was applied by a screen printing method, and then sintered after being dried. Further, a paste composed of nanoparticles of $TiO_2$ having a particle diameter of 400 nm was applied thereon by a screen printing methods and then sintered after being dried to obtain the porous oxide semiconductor layer.

A silver paste was applied on the transparent conductive film substrate by a screen printing method, and sintered after being dried to produce a collector wiring. Further, a glass with low melting point was applied on the collector wiring by a screen printing method, and then sintered after being dried to produce a collector wiring protective layer.

On the collector wiring protective layer and on a part of the porous oxide semiconductor layer, a paste composed of nanoparticles of $TiO_2$ having a particle diameter of 400 nm was applied by a screen printing method, and then sintered after being dried.

The substrate was dipped into a dye solution to support a sensitizing dye on the porous oxide semiconductor layer. The resultant product was used as a working electrode.

On the other hand, a metal-titanium plate was prepared. The titanium plate was etched to form recessed portions (sump portions) and an electrolyte injection hole corresponding to the shape of the cell, and then a platinum film was formed on the entire surface. The resultant product was used as a counter electrode. In use, the side on which the platinum film was formed was disposed so as to oppose the working electrode.

Furthermore, iodine, lithium iodide, terf-butyl pyridine, and dimethylpropyl-imidazolium iodide were dissolved in methoxyacetonitrile to prepare a liquid electrolyte.

The working electrode and the counter electrode thus prepared were laminated and sealed by forming a sealing layer made of an UV-curable resin. After the electrolyte was injected from the electrolyte injection hole, the injection hole was sealed by an UV-curable resin. In this way, a photoelectric conversion element for testing was obtained.

Comparative Example 2

A photoelectric conversion element was prepared in accordance with the same procedures as those followed in the above-described Example 4 except that the recessed portion (the sump portion) was not formed on the counter electrode.

Comparative Example 3

A photoelectric conversion element described in Japanese Unexamined Patent Application, First Publication No. 2002-280085 was prepared. That is, a photoelectric conversion element which includes in the main body, an oxide semiconductor electrode formed by adsorbing dye on an oxide semiconductor electrode material, a liquid or pseudo-liquid electrolytic solution containing electrolyte, and a counter electrode disposed so as to oppose the oxide semiconductor electrode through the electrolyte provided therebetween, and in which the main body has an aperture which is capable of opening and shutting and through which liquid composition is taken in and out, was prepared.

Then, life duration properties of each of the photoelectric conversion elements prepared as described above were evaluated.

The properties were evaluated continuously by using a solar simulator with a thermostat which could keep the temperature at 65° C., and the life duration was defined to represent a point in time when a short-circuit current of each element declines 20% from the initial value. On that occasion, evaluation of the properties was carried out in 5 different setting cases, that is, cases in which each one of four sides (top, bottom, right and left) of the cell was set on the top, and a case in which the cell was set horizontally. Then, a measured result of a setting case with the worst property was adopted.

As a result of evaluation, it is confirmed that the element of Example 4 has a longer life duration of more than 2000 hours, while the life duration of the respective element is 400 hours in Comparative Example 2 and about 1600 hours in Comparative Example 3.

While preferred embodiments of the invention have been described and illustrated above, it should be understood that these are exemplary of the invention and are not to be considered as limiting. Additions, omissions, substitutions, and other modifications can be made without departing from the spirit or scope of the present invention, Accordingly, the invention is not to be considered as being limited by the foregoing description, and is only limited by the scope of the appended claims.

INDUSTRIAL APPLICABILITY

According to the present invention, air bubbles can be exhausted effectively from the power generating area, so that a photoelectric conversion element possessing an improved power generation property and a long-term durability can be provided.

The invention claimed is:

1. A photoelectric conversion element comprising:
a first electrode having a porous oxide semiconductor layer which supports a sensitizing dye on a surface thereof and functioning as a photo electrode;
a second electrode disposed so as to oppose the first electrode;
an electrolyte disposed in at least a part of a space between the first electrode and the second electrode;
a collector wiring composed of a conductive material provided in the first electrode; and
a sump portion for the electrolyte provided around the collector wiring, wherein the sump portion is provided between the collector wiring and the porous oxide semiconductor layer.

2. The photoelectric conversion element according to claim 1, wherein an inclined portion is provided on the second electrode in a manner such that the clearance between the first electrode and the second electrode is wider in periphery of the sump portion than the other parts.

3. The photoelectric conversion element according to claim 1, further comprising a protective layer provided around the collector wiring, wherein the sump portion is provided between the protective layer and the porous oxide semiconductor layer.

* * * * *